United States Patent [19]

Jackson et al.

[11] Patent Number: 4,738,055

[45] Date of Patent: Apr. 19, 1988

[54] METHODS OF ADJUSTING OPTICAL FIBER CONNECTOR COMPONENTS

[75] Inventors: Kenneth W. Jackson, Lawrenceville; Norman R. Lampert, Norcross; Harold F. Muth, Jr., Roswell, all of Ga.

[73] Assignees: American Telephone and Telegraph Company, AT&T Bell Laboratories, Murray Hill; AT&T Technologies, Inc., Berkeley Heights, both of N.J.

[21] Appl. No.: 929,444

[22] Filed: Nov. 12, 1986

Related U.S. Application Data

[63] Continuation of Ser. No. 676,113, Nov. 29, 1984, abandoned.

[51] Int. Cl.[4] .................................................. B24B 1/00
[52] U.S. Cl. .................................. 51/281 R; 51/73 R; 51/72 R
[58] Field of Search .................. 51/72 R, 73 R, 98 R, 51/103 R, 103 C, 105 R, 267, 281 R, 281 P, 283 R, 323, DIG. 6; 350/96.20, 96.21

[56] References Cited

U.S. PATENT DOCUMENTS

| | | | |
|---|---|---|---|
| 2,427,849 | 9/1947 | Garwood | 51/283 R X |
| 4,016,855 | 4/1977 | Mimata | 51/267 X |
| 4,087,158 | 5/1978 | Lewis et al. | 350/96.21 |
| 4,107,242 | 8/1978 | Runge | 350/96.20 X |
| 4,186,998 | 2/1980 | Holzman | 350/96.21 |
| 4,240,695 | 12/1980 | Evans | 350/96.21 |
| 4,384,431 | 5/1983 | Jackson | 51/283 R X |
| 4,389,091 | 6/1983 | Lidholt et al. | 350/96.20 |
| 4,458,983 | 7/1984 | Roberts | 350/96.21 X |

FOREIGN PATENT DOCUMENTS 54-127337  10/1979  Japan ................................ 350/96.21

OTHER PUBLICATIONS

W. C. Young et al article, "Design and Performance of the Biconic Connector Used in the FT3 Lightwave System", 1981 International Wire and Cable Proceedings, 1981, pp. 411–418.
Balliet, IBM Technical Disclosure Bulletin, Aug. 9, 1981.
Balliet, IBM Technical Disclosure Bulletin, Sep. 28, 1984, E. Bright Wilson, Jr., *An Introduction to Scientific Research*, p. 109.

*Primary Examiner*—Robert P. Olszewski
*Attorney, Agent, or Firm*—Edward W. Somers

[57] ABSTRACT

An alignment sleeve (66) for holding two conically shaped portions (30–30) of plugs (24–24) each of which terminates an optical fiber (25) includes two conically shaped cavities (68, 70) communicating through a common minimal diameter plane (72). After the sleeve has been molded, a tool (100) faced with an abrasive material is inserted into each cavity of the sleeve and turned rotatably while a force is applied in a direction parallel to the longitudinal axis of the tool. This causes material to be removed from the walls defining the cavities so that when the two plugs are inserted into the cavities, the axes of the fibers will be aligned coaxially and the end faces of the fibers will have a predetermined separation. The methods of this invention also may be used to adjust a length measurement of plugs. This is accomplished by inserting a plug into a conically shaped cavity of a tool. A wall which defines the cavity of the tool is faced with an abrasive material which upon turning the plug abrades the plug to thereby increase the distance from a reference circumference of the plug to a pedestal (36) in which the free end of the optical fiber terminates.

12 Claims, 5 Drawing Sheets

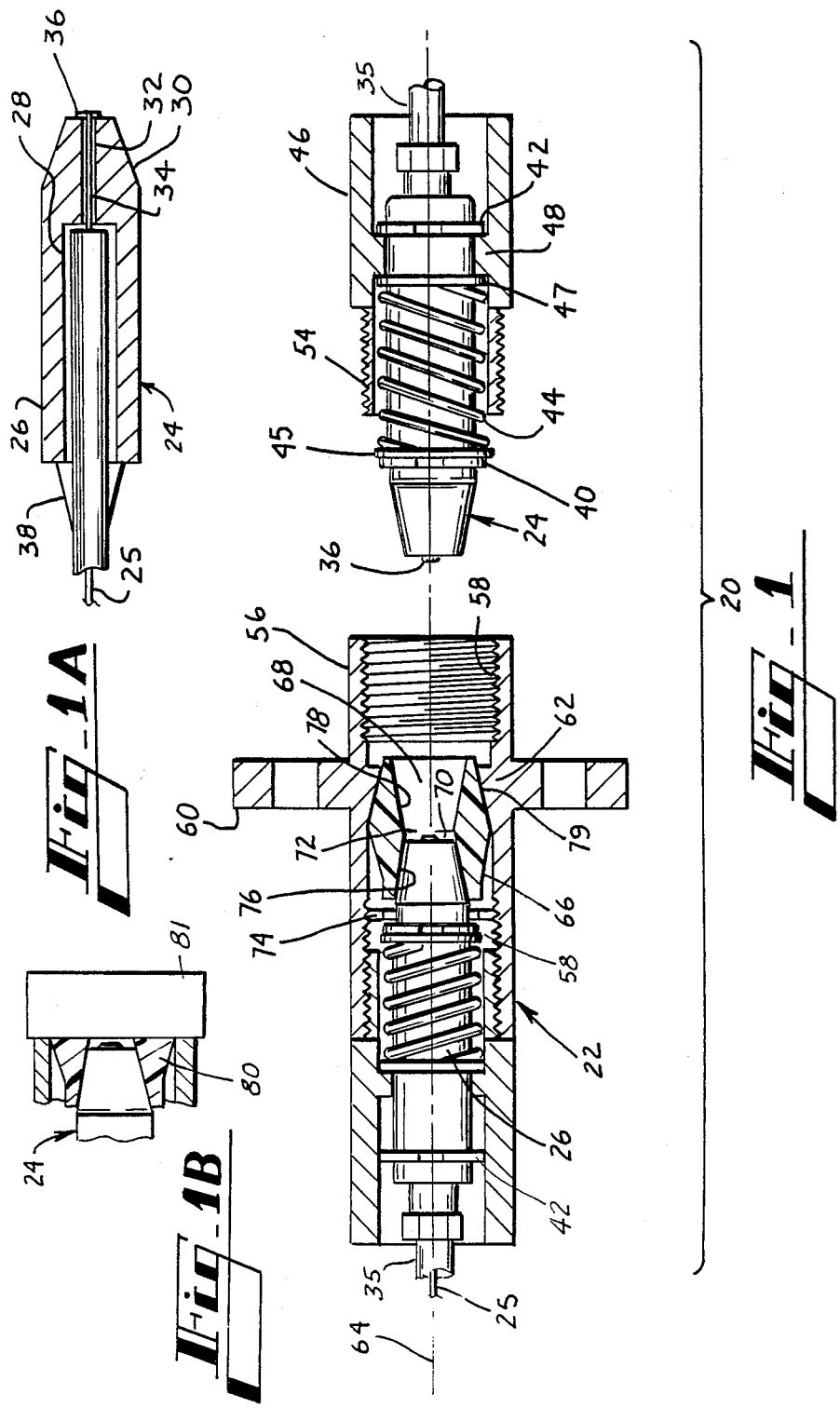

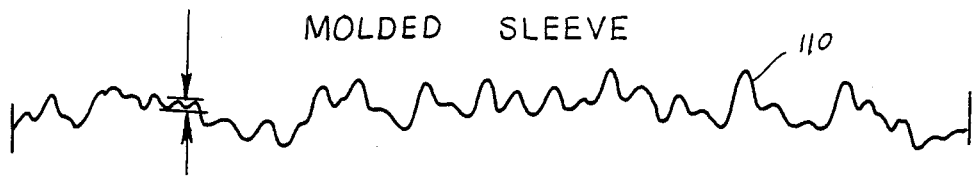
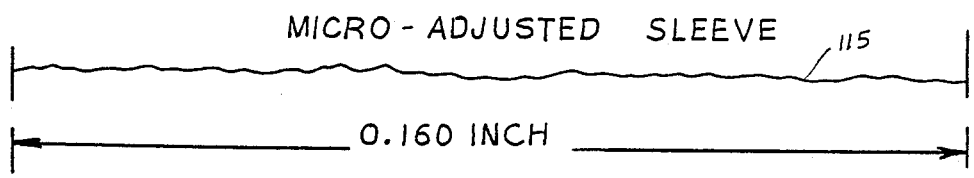
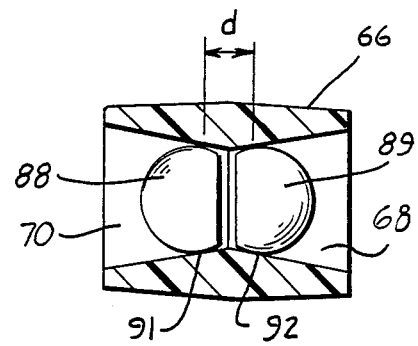
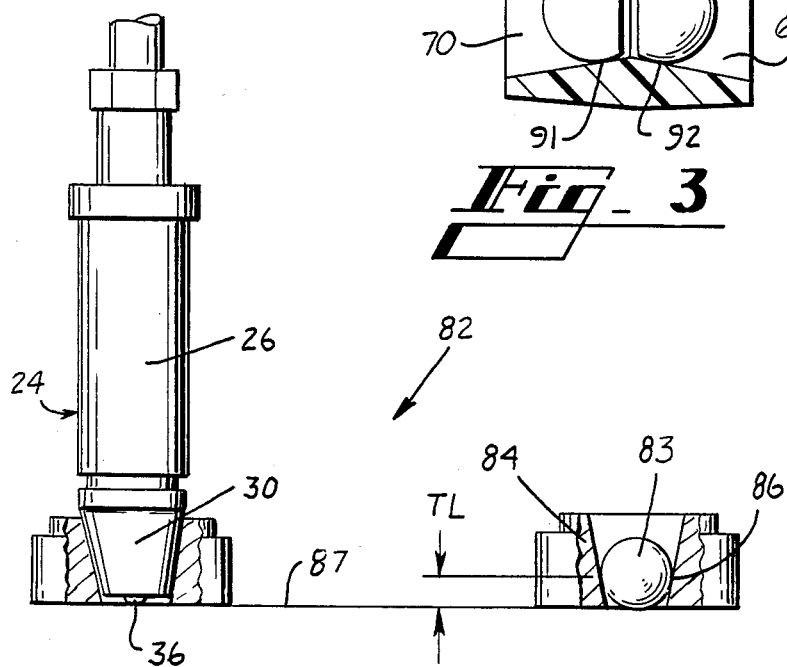

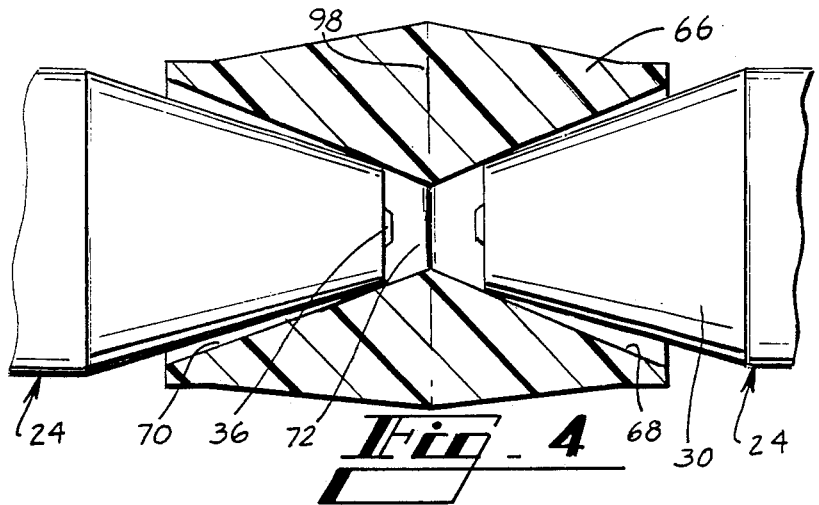
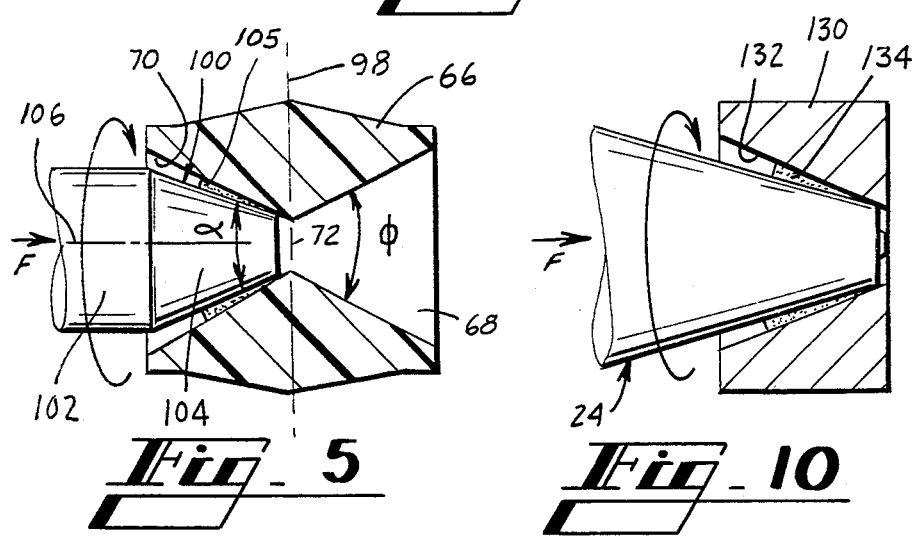
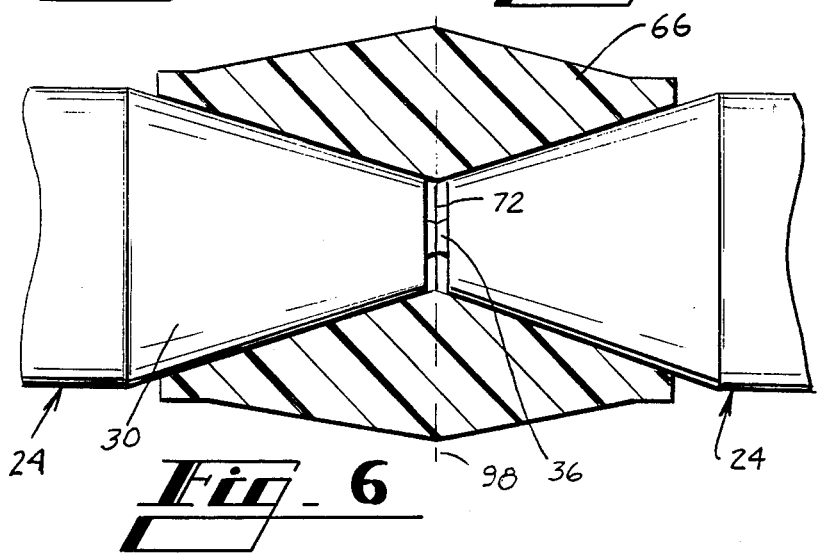

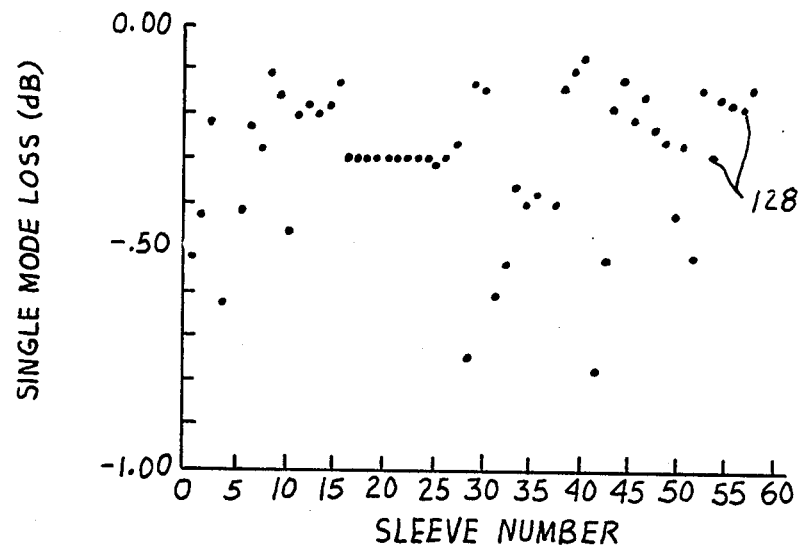
Fig_9
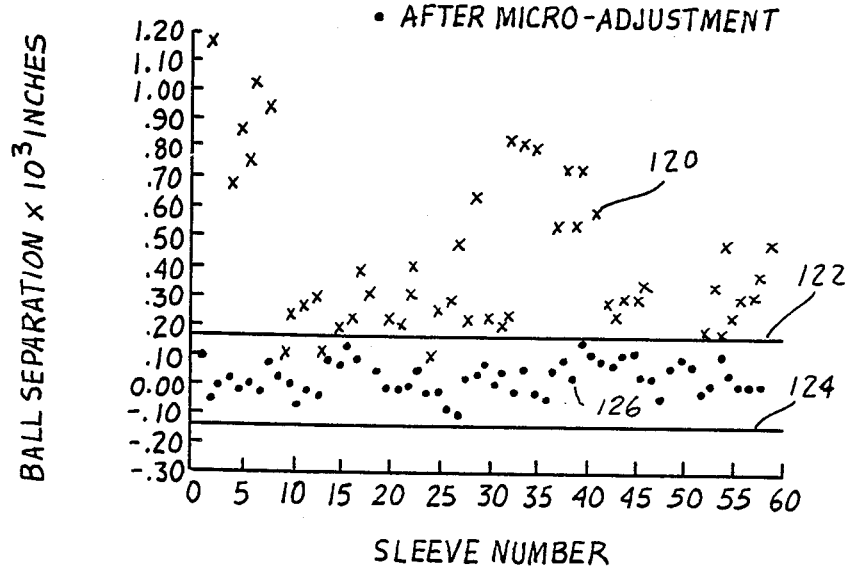
Fig_8

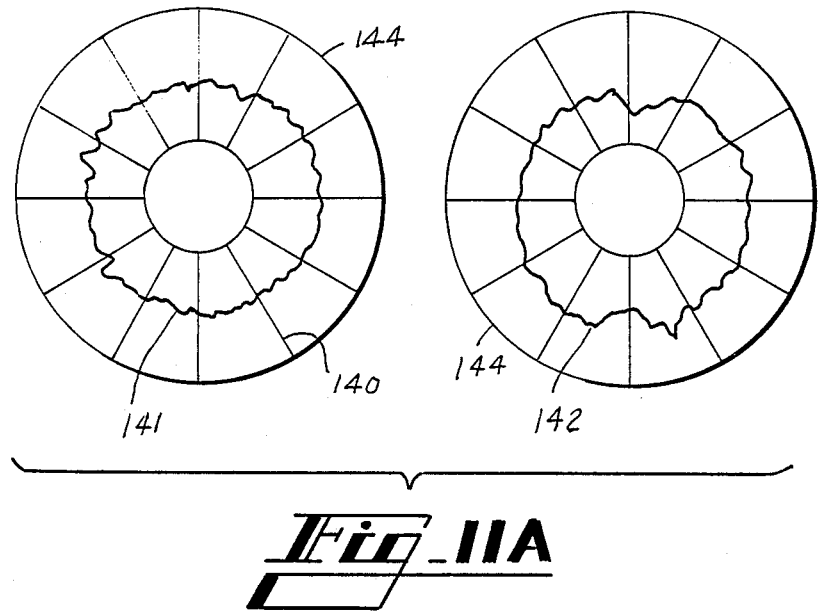
Fig_11A
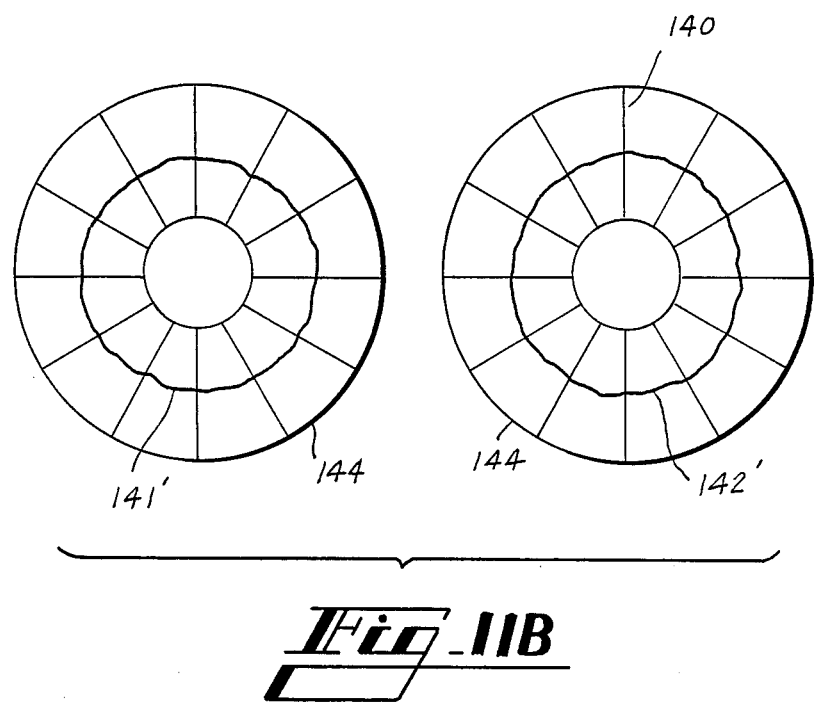
Fig_11B

METHODS OF ADJUSTING OPTICAL FIBER CONNECTOR COMPONENTS

This is a continuation, of application Ser. No. 676,113, filed Nov. 29, 1984, now abandoned.

TECHNICAL FIELD

This invention relates to methods of and adjusting optical fiber connector components and products produced thereby. More particularly, this invention relates to post molding methods for adjusting an alignment sleeve and/or optical fiber terminating plugs so that when the plugs are mounted in the sleeve, the fibers are aligned and have a perdetermined end separation.

BACKGROUND OF THE INVENTION

The use of optical fibers in communications is growing at an unprecedented rate. Low loss optical fibers which are produced by any one of several techniques may be assembled into ribbons which are then assembled into cables, or stranded into cables, or they may be enclosed singularly in a jacket and used in various ways in a central office, for example.

In order to assure that the low loss fibers which are produced today are not diminished in their effectiveness in systems, the fibers must be connected through intermateable connectors which preserve those low losses. For fiber ribbons, connectors comprise grooved chips which hold a plurality of fibers of one ribbon in alignment with fibers of another ribbon. Such a connector is shown for example in U.S. Pat. No. 3,864,018 which issued on Feb. 4, 1975 in the name of C.M. Miller.

For single fiber cables, connections may be made through a connector which is referred to as a biconic connector. See U.S. Pat. No. 4,107,242 which issued on Aug. 15, 1978 in the name of P. K. Runge. That connector includes a housing in which is mounted a biconic alignment sleeve. The sleeve includes two truncated, conically shaped cavities which communicate with each other through a common plane which has the least diameter of each cavity. Each of two fibers to be connected is terminated with a plug comprising a primary pedestal or truncated, conically shaped end which is adapted to be received in one of the cavities of the sleeve. At least portions of the conically shaped surfaces of the plug and of the sleeve serve as alignment surfaces and are intended to be conformable. The fiber extends through the plug and has an end which terminates in a secondary pedestal of the plug. A cylindrically shaped portion of the plug is connected to the truncated end. The plug is urged into seated engagement with the wall defining the cavity in which it is received.

Minimal loss between the connected fibers is achieved when the fibers which are terminated by the plugs are aligned coaxially and when the fiber end faces, each of which is planar, contact in a common plane. Considering the size of the fibers, for example one with a core diameter of 8 microns and a cladding diameter of 125 microns, the task of providing conformable, conical plug and sleeve surfaces in order to meet alignment and end separation requirements is a formidable one. Further, this task is made difficult by the somewhat imprecise surface tolerances which are achieved when molding the alignment sleeve.

The alignment sleeves as molded are checked for accuracy by inserting a guaging ball into each cavity and measuring the distance between reference circumferences of the walls of opposing cavities which are engaged by the balls. If the distance is too long, the plugs may seat within the cavities, but the end separation of the fiber end faces is too great. On the other hand, if the distance is too short, the secondary pedestals touch, but there is insufficient contact between the alignment surfaces. Further, if the fiber end faces contact each other prior to seating the conformable portions of the alignment surfaces of the plugs, the fibers within the plugs may become misaligned or the fiber end faces may become damaged. It has been very difficult to obtain simultaneously seating of the plugs in the sleeve cavities and end face contact of the fibers. In the past, an undesirably high number of sleeves have exhibited distances which were not within acceptable tolerance levels.

A problem also exists with respect to a so-called taper length of the plug. The plug taper length is defined as that distance from a reference circumference on the plug boundary to the terminated fiber end face which is the end face of the secondary pedestal. The initial adjustment of the taper length is accomplished with methods and apparatus disclosed in U.S. Pat. No. 4,384,431 which issued on May 24, 1983 in the name of K. W. Jackson. However, if the taper length is too long, the secondary pedestals may touch but there is no contact between the conforming surfaces. On the other hand, if the taper length is too short, the plugs seat within the cavities of the sleeve, but the end faces of the fibers are spaced apart by too great a distance.

The prior art does not provide an altogether satisfactory solution. For example, in one patent, a quantity of index matching optical fluid is positioned within the cavities of the sleeve, after which the fibers are pushed into the cavities until their end faces engage the conically shaped walls to align the fibers and to place their end faces in close adjacency. The optical fluid helps to reduce the transmission loss notwithstanding the fact that the end faces are not contacting. Although this arrangement may provide an adequate connection, it depends on an additional medium which may introduce contaminants at the fiber junction.

Semingly, the prior art is devoid of a simple solution to the problem of providing production sleeves and plugs at a relatively high yield for biconic connectors which may be used for multi or single mode lightguide fibers. Desirably, the solution does not involve additional elements or time in the connection procedures, but instead involves an adjustment of the high production yield, molded sleeves and plugs to achieve precision without the need of a skilled machinist.

SUMMARY OF THE INVENTION

The foregoing problems have been solved by the methods of this invention. A method is provided to adjust associated, conically shaped alignment surfaces of a plug, which terminates an optical fiber, and of a sleeve, which is adapted to receive the plug, to cause an end face of the fiber to occupy a predetermined position when the plug is received in the sleeve. The method includes the steps of juxtaposing one of the associated alignment surfaces of the plug and the sleeve, and a tool. An abrasive material is caused to be interposed between the tool and the one alignment surface and in contact with one alignment surface. Relative motion is caused between the tool and the one surface to cause the abrasive material to abrade the one surface to adjust the distance between a reference circumference of the one surface and a reference plane and cause the end face of the fiber to occupy a predetermined position with respect to the reference plane when the plug is received in the sleeve.

In another embodiment, associated alignment surfaces are used to cause a two cavity sleeve to hold the plugs of two fibers aligned with each other and to cause their end separation to be a predetermined amount. One of the associated conically shaped surfaces of a first truncated conically shaped plug which terminates an optical fiber and of a wall which defines a conically shaped cavity of the sleeve destined to receive the first plug is abraded by causing relative motion between the one surface and a tool which is provided with an abrasive material. Also, one of associated conically shaped surfaces of a second truncated conically shaped plug which terminates an optical fiber and of a wall which defines the other conically shaped cavity of the sleeve is abraded by causing relative motion between it and the tool. The abrading steps cause the distance between a reference circumference of one of the alignment surfaces of the first plug and associated cavity wall and a reference circumference of one of the alignment surfaces of the second plug and associated cavity wall to be a predetermined value. This results in the first and second plugs simultaneously being aligned coaxially in the sleeve and the end faces of the fibers terminated in the plugs having a predetermined separation.

In a preferred embodiment, the wall which defines each of the sleeve cavities is abraded by a tool having a truncated conically shaped end portion which is faced with an abrasive material and which is provided with a lubricant. When the tool is inserted into each cavity, its end engages the wall of the cavity before reaching a transverse centerline of the sleeve. Then the tool is turned rotatably while forces are applied to the tool in a direction parallel to a longitudinal axis of the sleeve. The tool is turned rotatably about an axis which is substantially coincident with the longitudinal axis of the sleeve.

An apparatus for adjusting alignment surfaces on the fiber terminating plugs and on the sleeve causes each sleeve to hold two plugs and the fibers aligned with each other and to cause their end separation to be a predetermined amount. In a preferred embodiment, the apparatus includes tool means including a conically shaped truncated surface which is provided with an abrasive material for abrading one of associated conically shaped surfaces of a first truncated conically shaped plug which terminates an optical fiber and of a wall which defines a conically shaped cavity of a sleeve destined to receive the first plug. Also, the tool means is capable of abrading one of the associated conically shaped surfaces of a second truncated conically shaped plug which terminates an optical fiber and of a wall which defines the other conically shaped cavity of the sleeve. As a result, the distance between a reference circumference of one of the alignment surfaces of the first plug and sleeve to a reference circumference of one of the alignment surfaces of the second plug and sleeve is a predetermined value. The tool means is turned by hand or by an apparatus which includes a flexible or selfaligning shaft about a longitudinal axis of the sleeve to cause the tool to remove material from one of each pair of associated surfaces of the plugs and the sleeve.

BRIEF DESCRIPTION OF THE DRAWINGS

Other objects and features of the present invention will be more readily understood from the following detailed description of specific embodiments thereof when read in conjunction with the accompanying drawings, in which:

FIG. 1 shows an elevational view of a biconic connector for lightguide fiber cables which includes an alignment sleeve and two plugs each of which terminates an optical fiber;

FIG. 1A is a detail view of a portion of a biconic connector plug;

FIG. 1B is a detail view of a single cavity alignment sleeve of a connector and a plug which terminates an optical fiber;

FIG. 2 shows an arrangement for gauging the seating of a plug in an alignment sleeve;

FIG. 3 is an elevational view of an alignment sleeve with gauging balls in position to indicate end face separation;

FIG. 4 is a schematic elevational view which shows plugs inserted into an alignment sleeve as molded;

FIG. 5 is a view of a tool which is used to adjust a sleeve;

FIG. 6 is a schematic elevational view of the plugs and the sleeve which are shown in FIG. 4 after the sleeve has been adjusted;

FIG. 7 is a schematic view which shows longitudinal surface profiles of a biconic sleeve surface before and after the application of the adjustment methods of this invention;

FIG. 8 shows ball separation characteristics for single mode biconic sleeves before and after adjustment;

FIG. 9 shows a sampling of losses of biconic connections using molded sleves which have been adjusted;

FIG. 10 is a schematic elevational view which shows another tool such as a sleeve which is used to adjust a plug; and FIGS. 11A and 11B show circumferential profiles of a biconic plug and sleeve before and after adjustment.

DETAILED DESCRIPTION

Referring now to FIG. 1, there is shown a biconic connector designated generally by the numeral 20. The biconic connector 20 includes a housing 22 for receiving two plugs 24—24 ach of which terminates a lightguide or optical fiber 25. Both the plug and the housing are made of a crushed silica, transfer molding grade epoxy composition, for example. As can be seen in FIG. 1A, each plug 24 includes a cylindrical portion 26 which includes a bore 28, and an end portion 30. The end portion 30 has a truncated conical shape and includes a passageway 32 that communicates with the bore 28.

A coated single optical fiber 25 which has been jacketed with a plastic material such as polyvinyl chloride to form a cable 35 is terminated with the plug 24. The jacketing material and the coating are removed from an end portion 34 of the single fiber cable. The cable is inserted into the bore 28 until the bared end portion 34 is received in the passageway 32 with an end portion of the fiber 25 extending into a secondary pedestal 36. An end face of the fiber 25 is coincident with the end face of the secondary pedestal 36. The cable at its exit from the bore 28 is provided with a strain relief member 38.

Each plug 24 is provided with retaining rings 40 and 42. The retaining ring 40 abuts a collar 45 which is fixedly located about the plug 24. A compression spring 44 is disposed about the cylindrical portion 26 of the plug between the collar 45 and a collar 47. The plug 24 is positiond in an end portion of a threaded holder 46 with the collar 47 in engagement with an annular lip 48 interior to the holder. The retaining ring 42 is disposed about the cylindrical portion 26 of the plug 24 on the other side of the lip 48 to hold the plug within the holder. A threaded portion 54 extends in the other direction from within the holder 46.

A center portion 56 of the housing 22 is adapted to receive the two threaded plug holders and two plugs 24—24. The center portion 56 includes two opposed internally threaded cavities 58—58 and a flange 60 adapted to be mounted to a supporting surface. The flange 60 is aligned with an internally disposed annular collar 62 which extends toward alongitudinal axis 64 of the housing. The center portion 56 of the housing also is adapted to receive an alignment sleeve 66 which comprises two opposed truncated, conically shaped cavities 68 and 70 which met at a common plane 72.

The alignment sleeve 66 is disposed within the portion 56 of the housing so that when the plugs 24—24 are mounted in the holders 46—46 and the threaded portions 54—54 turned into the cavities 58—58, the ends 30—30 of the plugs are received in the cavities 68 and 70 with the secondary pedestals in the vicinity of the common plane 72. Also, as the threaded portions 54—54 are turned into the housing portion 56, the plug portions 26—26 are moved through the openings defined by the lips 48—48 to move the retaining rings 42—42 out of engagement with the lips (see left side of FIG. 1). The retaining ring 40 of the left plug as viewed in FIG. 1 is adjacent to a sleeve retaining ring 74. The spring 44 causes the plug end portion 30 to be seated firmly in engagement with a wall 76 of the alignment sleeve. The ring 74 is threadably secured inside the housing portion 56 and although not necessarily in engagement with the sleeve, it prevents the sleeve from being removed inadvertantly from the housing. Further, the right plug end 30 as viewed in FIG. 1 is moved into the cavity 68 of the sleeve 66 and contacts a wall 78. The sleeve 66 may float within an opening 79 in the collar 62 to facilitate alignment of the two plugs 24—24.

In another embodiment, a sleeve 80 (see FIG. 1B) which resembles half of a sleeve 66 is used to connect a plug 24 to a device 81. For that arrangement, the end of the optical fiber must be aligned coaxially with the sleeve 80 and with a connective portion of the device 81 and have a predetermined separation with respect thereto.

Ideally, to achieve miniumum loss, the plugs 24—24 disposed within the sleeve 66 should have their longitudinal axes aligned and end faces of the fibers within the secondary pedestals 36—36 contacting each other or at worst spaced apart a slightly predetermined distance. The outer surface of the conical end 30 of each plug 24 and the surfaces of the walls 76 and 78 of the sleeve cavities are associated alignment surfaces which are intended to cause the desired positioning of the pedestals 36—36 when the conical ends of the plugs are received in the sleeve 66. The problem is that the alignment sleeves 66—66 as provided by transfer molding apparatus, for example, are not made within tolerances which result in the plugs 24—24 being aligned and having the required end separation in a considerable percent of the product.

In order to achieve the specified requirements, the sum of the distances from the common plane 72 to a reference circumference of the cavity 70 and a reference circumference of the cavity 68 must be in a predetermined range. Likewise a so-called taper length of each plug must be a predetermined distance. As will be recalled, the plug taper length is defined as the distance from a reference circumference on the plug boundary to the end face of the secondary pedestal 36. Testing procedures have been developed for determining the taper length of a plug for a biconic connector and for checking the distance between the reference circumferences of the sleeve.

Referring now to FIG. 2, there is shown an apparatus 82 which is used to measure the plug taper length. When a metallic gauging ball 83 is inserted into a metallic gauging sleeve at a location 86 a predetermined distance TL, which is referred to as the taper length and which may be monitored. The reference circumference is the circumference of the location where the ball 83 contacts the sleeve cavity wall. When a plug 24 is inserted into the gauging sleeve 84, the end of its secondary pedestal 36 may be above, at, or below a plane 87 through the end of the gauging ball. This determination is indicative of whether or not the plug taper length is too short, acceptable or too long.

A similar test also has been developed for checking alignment sleeves to determine whether the distance between reference circumferences of the sleeve is within a predetermined tolerance. This is accomplished as seen in FIG. 3 by inserting gauging balls 88 and 89, which are made of a suitable material, such as metal or ceramic material, for example, into each cavity of a sleeve 66. Then a distance "d" between the reference circumferernce 91 and 92 where the balls 88 and 89 engage the walls of the cavities 70 and 68 of the sleeve 66 is measured and compared to a standard value. It has been found that an unacceptable number of the sleeves 66—66, as molded, have distances between reference circumferences which are not within the tolerance range. As a result, the gauging balls 88 and 89 generally are spaced farther apart or closer together than required which results in plug ends, and therefore fiber end faces, being spaced too far apart or the fiber ends perhaps being misaligned or both.

As should be apparent, the problem of end face separation and alignment in biconic connectors is twofold. First, the sleeve cavities 68 and 70 themselves must meet precise configurations. Secondly, the plugs 24—24 each must have a taper length which is a predetermined value. The methods of this invention are used to solve both problems and provide plugs and sleeves which mate in a manner to provide a desired fiber end face separation and fiber alignment. This is accomplished by causing at least those portions of the outer surfaces of the conical ends 30—30 of the plugs 24—24 and the walls 76 and 78 of the sleeves 66—66 which are adjacent to the common plane 72 to be substantially conformable. It should be clear that those sleeves, as molded, in which the gauging balls are too close together are not able to be adjusted.

An enlarged view of an alignment sleeve, as molded, with two plugs 24'24 received therein is shown in FIG. 4. The sleeve 66 is molded and the plugs are molded so that when the plug 24 is inserted into the sleeve 66, it engages the cavity wall to one side of the common plane 72 as is shown in an exaggerated fashion in FIG. 4. The common plane 72, as will be recalled, coincides with a transverse axis 98 through the center of the sleeve 66. As can be seen, the end faces of the pedestals 36—36 and hence the end faces of the lightguide fibers which are terminated by the plugs 24—24 are spaced apart, farther in fact than allowed. Also, the surfaces of the plugs and sleeves have different included angles which are exaggerated in FIG. 4 for purposes of clarity.

Referring now to FIG. 5, there is shown schematically an apparatus for providing post molding adjustments to a sleeve 66. The apparatus includes a tool 100. The tool 100 includes a tapered portion 104. The tapered portion 104 has a precisely machined configuration which is a truncated conical shape. Further, the tool 100 is faced with an abrasive material 105, such as, for example, diamond particles in a nickel matrix, which is plated to the surface of the tapered portion of the tool.

The tool 100 is adapted to be turned rotatably by a cylindrical portion 102 about a longitudinal axis 106. In a preferred embodiment, the axis 106 is not fixed by mounting the tool. Rather the tool 100 and portion 102 are hand held and free to float to find a center of rotation, preferably at the center of a plane slightly to one side of the common plane 72. If mounted about a fixed axis of rotation, any error could be multiplied unless the axis of rotation is prealigned with the center of the sleeve in the vicinity of the common plane 72. In the alternative, the tool could be mounted on a flexible spindle instead of being hand held.

The tool 100 has a particular configuration. For example, the tapered portion 104 has a minimum diameter which is slightly greater than the diameter of the sleeve 66 along the common plane 72. As a result, the tool 100 engages a wall of each cavity to one side of the common plane 72. Because of molding flash, the circumference of the sleeve cavities along the common plane is not well defined. If the end of the tool 100 were bottomed out at the minimum diameter, its axis of rotation would be affected adversely.

This is aranged so that when the tool is rotated, its axis of rotation 106 is coincident with that of the cavity into which the tool has been inserted near the center of the common plane 72 of the sleeve. This is important inasmuch as this is the region where the fiber end faces either touch or are spaced apart. If the axis of rotation were to be determined at a distance spaced from the center of the sleeve 66, any error in finishing or molding could be propagated and multiplied undesirably as the common plane 72 is reached, which would affect adversely the critical region.

Another important parameter with respect to the tool is an angle, $\alpha$, which is the included angle between the line of revolution of the conically shaped end at diametrically opposite positions. Typically, the sleeve 66 as molded has an included angle $\phi$ which is in the range of about 20°. The tool end has an included angle which is slightly less and which is in the low end of the range for that of the cavity.

In operation, a sleeve which intentionally has been molded with a distance "d" slightly longer than desired is held in a support (not shown). The tool 100 is coated with a lubricant such as alcohol, for example, and inserted into each end of the sleeve 66 until it bottoms out in the vicinity of the common plane 72 (see FIG. 5). Relative motion is caused to occur between the tool 100 and the sleeve 66 by turning the portion 102 of the tool, by turning the sleeve 66, or by turning both. In a preferred embodiment, the tool 100 is caused to be turned rotatably about the axis 106 of the sleeve 66 to cause the abrasive material to engage and remove material from the wall of the sleeve which defines each cavity. If the tool 100 is hand held, it is turned in opposite rotary directions by finger motion while a force, F, is applied in a direction parallel to the axis 106 (see FIG. 5).

Because material is removed from each cavity wall, the gauging balls 88 and 89 when inserted, will become disposed closer together. Material is removed from the walls defining the cavities until the alignment surfaces of the plugs 24—24 and of the sleeve 66 are substantially conformable (see FIG. 6), at least adjacent to the common plane 72. The relative motion is caused to occur until the distance between a reference circumference of the cavity 68 to a reference circumference of the cavity 70 is within a predetermined range. As will be recalled, the reference circumference of each cavity is that circumference along which the cavity wall is contacted by a gauging ball. For a single cavity sleeve (see FIG. 1B) such as might be used to connect a cable to a device, for example, the adjustment is carried out until the distance from a reference circumference to a reference plane, which may be the plane 72, is a predetermined value. This insures a desired simultaneous fiber end face separation and centering registration. Also, it should be pointed out that this technique has increased substantially the production yield of acceptable sleeves.

Afterwards, a lint-free cloth is used to apply alcohol to the cavity surfaces to clean them. Then the cavity surfaces are dried with a jet stream of air and with the same lint-free cloth. In a next step, the cavity walls of the sleeve are polished with an antistatic, dust repellant material. Then it is cleaned, air-dried, cleaned with alcohol, redried and cleaned with a lint-free cloth.

It should be realized that the tool 100 could comprise a plug 24 which is provided with an abrasive material. Also, it should be apparent that a tool could be juxtaposed to the conical surface of the cavity 68 or 70 and an abrasive medium interposed between the tool and the cavity surface and in contact with the cavity surface. The relative motion causes the distance between the two reference circumferences to decrease. A suitable abrasive medium which may be interposed between the surfaces is an aluminum oxide in a water-alcohol carrier, for example.

Further, the same tool 100 is used to adjust both cavities. This results in the cavities 68 and 70 being matched, which is not necessarily true following molding.

Going now to FIG. 7, there is shown a profile 110 of a sleeve 66 after it is molded, then cured, and a profile 115 after it has been adjusted by the conformable lapping technique of this invention. Each profile is taken over the length of the tapered portion of the sleeve. As can be seen in FIG. 7, the conformable lapping tchnique produces a profile 115 which is substantially smoother and more straight than that of the connector component in the as molded condition.

FIG. 8 is even more telltale of the results achieved by the methods and apparatus of this invention. In FIG. 8, points designated 120 and located above a horizontal line 12 show gauging ball separation of a number of sample sleeves 66—66 prior to the application of the methods of this invention. After the sleeves 66—66 have been adjusted, the range of ball separation is lowered substantially as is evidenced from the plotting of points 126—126 between the two horizontal lines 122 and 124. In FIG. 9, points 128—128 show the losses encountered with single mode fibers connected with sleeves 66—66 after the sleeves have been micro-adjusted in accordance with this invention.

Viewing now FIG. 10, there is shown an arrangement of a tool 130 which is used to adjust the taper length of a plug 24. The tool 130 includes a cavity 132 which is machined to have a precise truncated conical shape and which is faced with an abrasive material 134 such as that which is used to face the tool 100 of FIG. 5. A plug 24 having a less than required taper length is dippd in alcohol and inserted into the cavity 132 of the tool 130 and turned rotatably while a longitudinal force F is applied. This caused material to be removed from the surface of the plug and results in a longer taper length. It should be apparent that the tool 130 could comprise a sleeve 66 having cavity walls which have been faced with an abrasive material. Afterwards, the plug is cleaned and dried and polished as described with respect to the sleeve adjustment.

This last-mentioned technique facilitates the repair of damaged plug-terminated fibers. In the event that the fiber end in the secondary pedestal 36 becomes scratched inadvertently, the end of the pedestal is refinished which thereby reduces the taper length measurement. The required taper length is reachieved by inserting the plug 24 into a tool sleeve having its cavities lined with the abrasive material and turning rotatably the plug while applying a longitudinal force F thereto.

The adjustment of the plug 24 also causes removal of the sharp leading edge of the plug end portion 30. As a result, damage to the sleeve 66 during insertion is reduced substantially.

This technique improves the longitudinal surface profile of the plug and the roundness of its circumferential surface. The profiles shown in FIG. 7 also apply to plugs which are adjusted in accordance with this invention. The improvement in roundness of the sleeve cavity walls or of the plug conical surface is shown by comparing FIGS. 11A and 11B. Radial lines 140—140 shown in FIGS. 11A and 11B are provided for graphing purposes. FIG. 11A shows circumferential profiles 141 and 142 of a sleeve cavity wall or of a plug outer surface on charts 144—144 before adjustment and FIG. 11B shows their configurations 141' and 142' afterwards.

It is to be understood that the above-described arrangements are simply illustrative of the invention. Other arrangements may be devised by those skilled in the art which will embody the principles of the invention and fall within the scope and spirit thereof.

What is claimed is:

1. A method of adjusting associated conically shaped alignment surfaces of a plug, which terminates an optical fiber, and a sleeve, which is adapted to receive the plug, to cause an end face of the fiber to occupy a predeterined position when the plug is received in the sleeve, said method comprising the steps of:
 juxtaposing one of the associated alignment surfaces of the plug and the sleeve, and a tool;
 interposing an abrasive material between the tool and the one alignment surface and in contact with the one alignment surface; and
 causing relative motion between the tool and the one surface to cause the abrasive material to abrade the one surface to adjust the distance between a reference circumference of the one surface and a reference plane and cause the end face of the fiber to occupy a predetermined position with respect to the reference plane when the plug is received in the sleeve.

2. A method of adjusting conically shaped alignment surfaces of two plugs, each terminating an optical fiber, and a sleeve, which is adapted to receive the plugs, to cause the sleeve to hold the plugs with the fibers being aligned coaxially and having a predetermined end separation, said method including the steps of:
 positioning a tool, which is provided with an abrasive material, in contact with one of associated conically shaped alignment surfaces of a first truncated conically shaped plug which terminates an optical fiber and of a wall which defines a conically shaped cavity of a sleeve adapted to receive the first plug;
 positioning the tool in contact with one of associated conically shaped alignment surfaces of a second truncated conically shaped plug which terminates an optical fiber and of a wall which defines another conically shaped cavity of the sleeve adapted to receive the second plug; and
 causing relative motion between the tool and each surface it contacts to abrade each surface to adjust the distance between a reference circumference of one of the alignment surfaces of the first plug and associated cavity wall to a reference circumference of one of the alignment surfaces of the second plug and associated cavity wall which results in the fibers being aligned coaxially and having a predetermined end separation when the plugs are received in the sleeve.

3. The method of claim 2, wherein the walls which define the cavities in which are received the first and second plugs are abraded to remove material therefrom and thereby cause the distance between reference circumferences of the cavities which engage reference gauging balls to be decreased.

4. The method of claim 3, wherein a tool which has a truncated conically shaped end portion and which is adapted to be turned rotatably is inserted into each cavity of the sleeve until its leading end engages a cavity wall in the vicinity of a transverse centerline of the sleeve to cause an axis of rotation of the tool to be substantially coaxial with a longitudinal axis of the cavity in which it is received at the center of a common plane between the cavities, wherein relative motion is caused between the tool and the surface of each cavity wall by turning the tool about the axis of rotation, and wherein forces are applied to the tool in a direction parallel to the longitudinal axis of the sleeve as the tool is turned.

5. The method of claim 4, which also includes the step of providing a lubricant between the tool and the surface of each cavity wall, and wherein subsequent to the adjusting of the distance, the method includes the steps of cleaning, drying, and polishing the cavity walls.

6. The method of claim 4, wherein the abrading of the cavity walls causes at least those portions of the alignment surfaces adjacent to the common plane to be substantially conformable.

7. The method of claim 2, wherein tha abrading of the one surface causes at least those portions of the alignment surfaces adjacent to the common plane to be substantially conformable.

8. The method of claim 2, wherein the abrading is accomplished to remove material from the conically shaped portion of at least one plug to adjust its length by inserting th plug into a conically shaped cavity of a tool, the wall of the tool which defines the cavity being provided with an abrasive material, and wherein relative motion is caused to occur between the tool and the plug.

9. The method of claim 8, wherein the relative motion is rotational, wherein forces are applied to the plug in a direction parallel to the longitudinal axis of the plug as the relative rotational motion is caused to occur and wherein subsequent to the adjusting of the plug length, the outer conical surface of the plug is cleaned, dried and polished.

10. A method of preparing an alignment sleeve, comprising two truncated cone-shaped cavities which communicate with each other through a common minimum cross-sectional plane, to receive two conically shaped plugs, each of which terminates an optical fiber, such that longitudinal axes of the fibers are aligned coaxially and such that the fibers have a predetermined end separation, said method including the steps of:
   inserting a lapping tool having a truncated cone-shaped end portion which is faced with an abrasive material into each end of the alignment sleeve until its leading end engages a cavity wall in the vicinity of a transverse centerline of the sleeve to cause the axis rotation of the tool to be substantially coincident with a longitudinal axis of the sleeve;
   causing the lapping tool to be turned rotatably about a longitudinal axis thereof; while
   applying a force to the tool in a direction along the longitudinal axis of the tool to cause the tool to remove material from the walls of the cavities of the sleeve and to adjust the distance measured along the longitudinal axis of the sleeve between the centers of two calibration balls which are inserted into the cavities in seated engagement with the walls which define the cavities.

11. A method of adjusting conically shaped alignment surfaces of a sleeve, which is adapted to receive two plugs, each terminating an optical fiber, to cause the sleeve to hold the plugs with the fibers being aligned coaxially and having a predetermined end separation, said method including the steps of:
   positioning a truncated conically shaped end portion of a tool, which is provided with an abrasive material, in contact with an alignment surface of a wall which defines a conically shaped cavity of a sleeve adapted to receive a first plug which terminates an optical fiber;
   positioning the end portion of the tool in contact with an alignment surface of a wall which defines another conically shaped cavity of the sleeve adapted to receive a second plug which terminates an optical fiber; and
   turning the tool when in contact with each surface to abrade each surface and remove material therefrom and thereby cause the distance between reference circumferences of the cavities which engage reference gauging balls to be decreased, the tool having a truncated conically shaped end portion which is adapted to be inserted into each cavity of the sleeve and turned until its leading end engages a cavity wall in the vicinity of a transverse centerline of the sleeve to cause an axis of rotation of the tool to be substantially coaxial with a longitudinal axis of the cavity in which it is received at the center of a common plane between the cavities, wherein forces are applied to the tool in a direction parallel to the longitudinal axis of the sleeve as the tool is turned, and wherein the abrading of the cavity walls of the sleeve causes at least those portions of the alignment surfaces adjacent to the common plane to be substantially smooth and substantially conformable with substantially smooth surfces of the plugs which are adapted to be received in the cavity and to cause the alignment surfaces to hold the plugs with an end separation and an eccenticity which are sufficiently low to facilitate the optical connection of single mode fibers which are terminated by the plugs with a loss which does not exceed about 1dB.

12. A method of adjusting conically shaped alignment surfaces of two plugs, each terminating an optical fiber, and being adapted to be received in a sleeve so that the plugs are held with the fibers being aligned coaxially and having a predetermined end separtion, said method including the steps of:
   inserting a truncated conically shaped end portion of a first plug which terminates an optical fiber into a conically shaped cavity of a tool which is provided with an abrasive material to contact an alignment surface of the end portion of the plug with the abrasive material;
   inserting a truncated conically end portion of a second plug which terminates an optical fiber into a conically shaped cavity of the tool which is provided with an abrasive material to contact an alignment surface of the end portion of the plug with the abrasive material;
   causing to abrade each surface and remove material from the end portion of each plug to adjust the distance between a reference circumference of the alignment surface of the first plug to a reference circumference of the alignment surface of the second plug when the plugs are received in opposed truncated conically shaped cavities of a sleeve which results in the fibers being aligned coaxially and having a predetermined end separation when the plugs are received in the sleeve, the abrading of the plugs causing at least portions of the alignment surfces of the plugs to be substantially smooth and substantially conformable with substantially smooth surfaces of the sleeve so that the plugs are held with an end separation and an eccenticity which are sufficiently low to facilitate the connection of single mode fibers which are terminated by the plugs with a loss which does not exceed about 1dB.

* * * * *